United States Patent
Mittal

(10) Patent No.: US 7,292,846 B2
(45) Date of Patent: Nov. 6, 2007

(54) APPARATUS, AND ASSOCIATED METHOD, FOR RETRIEVING MOBILE-NODE DEVICE MANAGEMENT TREE INFORMATION

(75) Inventor: Gaurav Mittal, San Diego, CA (US)

(73) Assignee: Nokia Corporation, Espoo (FI)

( * ) Notice: Subject to any disclaimer, the term of this patent is extended or adjusted under 35 U.S.C. 154(b) by 753 days.

(21) Appl. No.: 10/377,413

(22) Filed: Feb. 28, 2003

(65) Prior Publication Data
US 2004/0171382 A1 Sep. 2, 2004

(51) Int. Cl.
*H04M 3/00* (2006.01)
(52) U.S. Cl. ............... 455/418; 455/419; 370/338
(58) Field of Classification Search ........... 455/449, 455/422.1, 414.1, 418, 419, 410; 370/338, 370/395.32
See application file for complete search history.

(56) References Cited

U.S. PATENT DOCUMENTS 6,587,685 B2 *  7/2003  Mittal et al. ............... 455/419
7,139,565 B2 *  11/2006  Fiatal et al. ............... 455/423
2002/0151315 A1 *  10/2002  Hendrey ..................... 455/466
2003/0103484 A1 *  6/2003  Oommen et al. ........... 370/338
2005/0026635 A2 *  2/2005  Michaels et al. ........... 455/466
2006/0154649 A1 *  7/2006  Pedersen et al. ......... 455/412.1
2007/0027832 A1 *  2/2007  Fiatal et al. ................... 707/1

* cited by examiner

*Primary Examiner*—Joy K. Contee

(57) ABSTRACT

Apparatus, and an associated method, for facilitating exchange of configuration indicia associated with a mobile node operable in a radio communication system. The mobile node is dynamically-configurable, and includes a DevMan tree. The indicia is provided to a network manager responsive to request therefore or upon initiation by the mobile node. When initiated at the network, a request message generator located at a network manager generates a Get message to request a root directory of the be provided to the network manager. The mobile node, upon delivery of the Get message thereto, retrieves an object map of the DevMan tree, defines it using recursion in a single response message, and sends the object map to the network manager.

22 Claims, 6 Drawing Sheets

401  <SyncML>
402    <SyncHdr>
403      <VerDTD>1.1</VerDTD>
404      <VerProto>DM/1.1</VerProto>
405      <SessionID>1</SessionID>
406      <MsgID>1</MsgID>
407      <Target><LocURI>ESN:23514006161</LocURI></Target>
408      <Source><LocURI>http://carmine.starfish.com/servlet/dmdemo</LocURI></Source>
409      <RespURI>http://66.120.209.36/servlet/dmdemo?s=A28SUQAA</RespURI>
410    </SyncHdr>
411    <SyncBody>
412      <Status>
413        <CmdID>1</CmdID>
414        <MsgRef>1</MsgRef><CmdRef>0</CmdRef><Cmd>SyncHdr</Cmd>
415        <TargetRef>http://carmine.starfish.com/servlet/dmdemo</TargetRef>
416        <SourceRef>ESN:23514006161</SourceRef>
417        <Data>212</Data> <!--Status code for OK, authenticated for session-->
418      </Status>
419      <Status>
420        <CmdID>2</CmdID>
421        <MsgRef>1</MsgRef><CmdRef>1</CmdRef><Cmd>Alert</Cmd>
422        <Data>200</Data> <!--Status code for OK-->
423      </Status>
424      <Sync>
425        <CmdID>3</CmdID>
426        <Get>
427          <CmdID>4</CmdID>
428          <Item>
429            <Target><LocURI>.</LocURI></Target>
430          </Item>
431        </Get>
432      </Sync>
433    </SyncBody>
434  </SyncML>
```

FIG. 5    500

```
501  <SyncML>
502   <SyncHdr>
503    <VerDTD>1.1</VerDTD>
504    <VerProto>DM/1.1</VerProto>
505    <SessionID>1</SessionID>
506    <MsgID>1</MsgID>
507    <Target><LocURI>http://66.120.209.36/servlet/dmdemo?s=A28SUQAA</LocURI></Target>
508    <Source><LocURI>ESN:23514006161</LocURI></Source>
509   </SyncHdr>
510   <SyncBody>
511    <Status>
512     <CmdID>1</CmdID>
513     <MsgRef>1</MsgRef><CmdRef>0</CmdRef><Cmd>SyncHdr</Cmd>
514     <TargetRef>ESN:23514006161</TargetRef>
515     <SourceRef>http://carmine.starfish.com/servlet/dmdemo</SourceRef>
516     <Data>200</Data> <!-- SyncHdr accepted -->
517    </Status>
518    <Status>
519     <CmdID>2</CmdID>
520     <MsgRef>1</MsgRef><CmdRef>3</CmdRef><Cmd>Sync</Cmd>
521     <Data>200</Data> <!-- Sync element ok-->
522    </Status>
523    <Status>
524     <CmdID>3</CmdID>
525     <MsgRef>1</MsgRef><CmdRef>4</CmdRef><Cmd>Get</Cmd>
526     <Item><!-- Open the item for Root node>
527      <Meta><Format xmlns="syncml:metinf">node</Format></Meta>
528      <Target><LocURI>.</LocURI></Target>
529      <Name>CDMA Settings</Name>
530      <Item><!-- Open the item for CDMA settings node>
531       <Meta><Format xmlns="syncml:metinf">node</Format></Meta>
532       <Target><LocURI>./CDMAsettings</LocURI></Target>
533       <Name>IS683params</Name>
534       <Item><!-- Open the item for IS683 params node>
535        <Meta><Format xmlns="syncml:metinf">node</Format></Meta>
536        <Target><LocURI>./CDMAsettings/IS683params</LocURI></Target>
537        <Name>R-UIM</Name>
```

FIG. 6

```
538   <Item><!-- Open the item for R-UIM node -->
539   <Meta><Format xmlns="syncml:metinf">node</Format></Meta>
540   <Target><LocURI>./CDMAsettings/IS683params/R-UIM</LocURI></Target>
541   <Name>PRL</Name>
542     <Item>
543       <Meta>
544         <Format xmlns="syncml:metinf">leaf</Format>
545         <Type xmlns="syncml:metinf">b64</Type>
546       </Meta>
547       <Target><LocURI>./CDMAsettings/IS683params/R-UIM/PRL</LocURI>
548       </Target>
549       <Data>---PRL data ---</Data>
550     </Item> <!-- Close item for PRL Node -->
551   </Item> <!-- Close item for PRL Data -->
552   <Item>
553     <Meta><Format xmlns="syncml:metinf">node</Format></Meta>
554     <Target><LocURI>./CDMAsettings/IS683params/R-UIM</LocURI></Target>
555     <Name>NAM</Name>
556     <Item>
557       <Meta>
558         <Format xmlns="syncml:metinf">leaf</Format>
559         <Type xmlns="syncml:metinf">b64</Type>
560       </Meta>
561       <Target><LocURI>./CDMAsettings/IS683params/R-UIM/NAM</LocURI></Target>
562       </Target>
563       <Data>---NAM data ---</Data>
564     </Item> <!-- Close item for NAM Node -->
565   </Item> <!-- Close item for NAM Data -->
566 ... repeat approach for A-Key and others.
567   </Item> <!-- Close the item for R-UIM node -->
568   <Item><!-- Open the item for Handset node>\
569 ... repeat define the child node and leaf objects for Handset node
570   </Item> <!-- Close the item for Handset node -->
571 </Item> <!--Close the item for IS683params node>
572 ... repeat for all other nodes defined.
```

500

APPARATUS, AND ASSOCIATED METHOD, FOR RETRIEVING MOBILE-NODE DEVICE MANAGEMENT TREE INFORMATION

TECHNICAL FIELD

The present invention relates generally to a radio communications system, such as a wireless telecommunications network, having a mobile node of a dynamically-alterable configuration, configurable at the mobile node, independent of a network manager. More particularly, the present invention relates to an apparatus, and an associated method, by which to facilitate retrieval by, or other exchange to, the network manager of capability indicia representative of the mobile-node configuration, or capability.

BACKGROUND OF THE INVENTION

Advancements in communication technologies have permitted the development and installation of many various types of communication systems. Wireless communication systems exemplify of communication systems that have benefited from the advancements in communication technologies.

In a wireless communication system, a radio link forms at least a portion of a communication path upon which communication signals are transmitted. A wireless communication system can be implemented as a mobile communication system as the radio link is substituted for a conventional wireline, otherwise required to complete the communication path upon which the communication signals are transmitted. And, when implemented as a mobile communication system, increased mobility of communication is, as a result, provided.

Network infrastructures of various types of wireless communication systems have, for instance, been installed throughout significant geographical regions. The network infrastructures of cellular communication systems, have been installed, available for usage by large numbers of subscribers to communicate therethrough. Access to communicate by way of a cellular communication system is typically provided pursuant to purchase of a service subscription. In a cellular communication system, telephonic communication of both voice and data is typically provided pursuant to the service subscription.

In a conventional, cellular communication system, a subscriber thereto typically utilizes a mobile terminal that is formed of a radio transceiver. A radio transceiver is capable both of transmitting and of receiving radio signals communicated upon radio links formed between the mobile terminal and the network infrastructure of the communication system. The term "user" shall be used herein, generally to identify an individual utilizing the mobile terminal to communicate therethrough.

Increasingly, cellular communication systems are constructed to make use of digital communication techniques in which data that is to be communicated during operation of the communication system is communicated in digitized form. Circuitry is utilized to process the data, prior to its transmission as well as, also, subsequent to its reception.

A mobile terminal is typically packaged in a housing sized to permit the mobile terminal to be readily carried by the user. Various constructions of mobile terminals are sized to permit the user thereof to carry the mobile terminal in a shirt pocket, or the like, conveniently to have the mobile terminal available at any time to place or to receive a call therethrough.

Because the mobile terminal utilizes processing circuitry, additional functions, in addition to the functions required to effectuate conventional communication operations, may be carried out by the mobile terminal. That is to say, the functionality of other types of devices may be incorporated into the mobile terminal. Information processing and retrieval functions are often incorporated into a mobile terminal. Furthermore, mobile terminals are increasingly constructed to provide for multi-media communication services. For example, digital-video devices, such as digital cameras, may be incorporated within a mobile terminal by which to collect digital image data that subsequently is communicated by the transceiver circuitry of the mobile terminal.

The mobile terminal might well be adapted, subsequent to its initial manufacture or initial association with a cellular communication system to provide for other functions or otherwise to have its operational parameters changed. The alteration, adaptation, update of, or other change to the functionality of the mobile terminal may be made independent of a network manager of the communication network in which the mobile terminal is operable. Network management of the mobile terminal, forming a mobile node in such a network, might not be able to be effectuated as a result of such alterations or changes.

The functionality of many mobile terminals, as well as other devices, are defined in terms of a device management (hereinafter "DevMan") tree (also known as a logic tree). The DevMan tree is formed using one or more Device Description Framework (DDF) descriptions of objects. Each DDF description is a logical grouping of related objects, all described in the same document. A DevMan tree is constructed, or initiated, using one or more of such DDF descriptions. Thus, all objects instantiated in a DevMan tree come from one of the DDF documents. And, while the DDF document for objects is common to all devices, the DevMan tree need not be the same for all of the devices. As noted above, a digital camera, for example, may be added to the mobile node. The DDF for enabling a camera attachment to the mobile node might well be the same for mobile nodes of the same make. But, when the tree based on this DDF is created in each mobile node, it may be created at different locations in the DevMan tree.

A network DevMan server conventionally is able to obtain client (e.g., mobile node) capability information associated with a DevMan client tree and, responsive thereto, to exert managerial control over the DevMan client. Existing management protocols are available by which to support the retrieval of the value, or attributes, of individual ones of the objects and the structure thereof that define the DevMan tree.

Existing communication protocols, such as SNMP, provide for Get messages for individual objects, necessitating multiple Get messages to obtain the information for multiple objects of a DevMan tree. SNMPv2 supports a Get-Bulk message which may request the value of each of a collection of objects requested in the message, and a response thereto carries the values of each object in the same response message. Get and Get-Bulk messages, however, require that each node in the DevMan tree structure be individually queried to obtain a complete object map of a DevMan tree showing how all objects in the DevMan tree are related. Thus, to obtain an object map of a DevMan tree, a request message and response message would need to be transmitted and received for each node of a DevMan tree, thereby inefficiently utilizing the band width capacity of a radio link.

Another device management protocol is SYNC ML DM1.1 or a variant thereof, such as an updated version, i.e., SYNC ML DM1.1.1, or a subsequent revision thereof. An existing version of this protocol, however, supports only a Get message procedure for retrieving the value of an object. To retrieve a collection of objects, including an object map of a DevMan tree, this protocol requires several Get messages, or a single Get message listing all of the objects for which the information is requested. When the node with which the network manager is associated is a mobile node, such as a mobile terminal together with additional functionality, the need to send a plurality of Get messages over a radio link extending to the mobile node, and the corresponding response messages generated responsive thereto, inefficiently utilizes the band width capacity of the radio link. And, a large Get message, listing all of the required objects for which information is requested, also is inefficient as the message-size increases proportional with the number of objects for which information is requested.

Accordingly, existing protocols are inadequate for use by a network manager in conjunction with a dynamically-configurable mobile node to obtain an object map of a client DevMan tree. Any manner by which to provide a more efficient mechanism by which to facilitate retrieval or other exchange of an object map of a DevMan tree from a mobile node to permit a network manager to effectuate network management operations would be advantageous.

It is in light of this background information related to communications with a mobile node of a communication network that the significant improvements of the present invention have evolved.

SUMMARY OF THE INVENTION

The present invention, accordingly, advantageously provides an apparatus, and an associated method, for a network having a mobile node, of a dynamically-alterable configuration, configurable at the mobile node, independent of a network manager. Accordingly, a detector is configured to receive a request message from a network manager for root directory of a DevMan tree maintained at the mobile node. A retriever is operatively connected to the detector and, responsive to detection of the request message by the detector for retrieving the root directory, retrieves an object map of the DevMan tree. A response generator operatively connected to the retriever then generates to the network manager in a single response message a description of the retrieved object map of the entire DevMan tree.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 exemplifies a Request message of the message sequence of FIG. 3; and FIGS. 5-6 exemplify a Response message of the message sequence of FIG. 3.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning radio communications, Extensible Markup Language (XML), and the like have been omitted inasmuch as such details are not considered necessary to obtain a complete understanding of the present invention, and are considered to be within the skills of persons of ordinary skill in the relevant art.

It is noted that, unless indicated otherwise, functions described herein are performed by a processor such as a microprocessor, a microcontroller, an application-specific integrated circuit (ASIC), an electronic data processor, a computer, and/or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
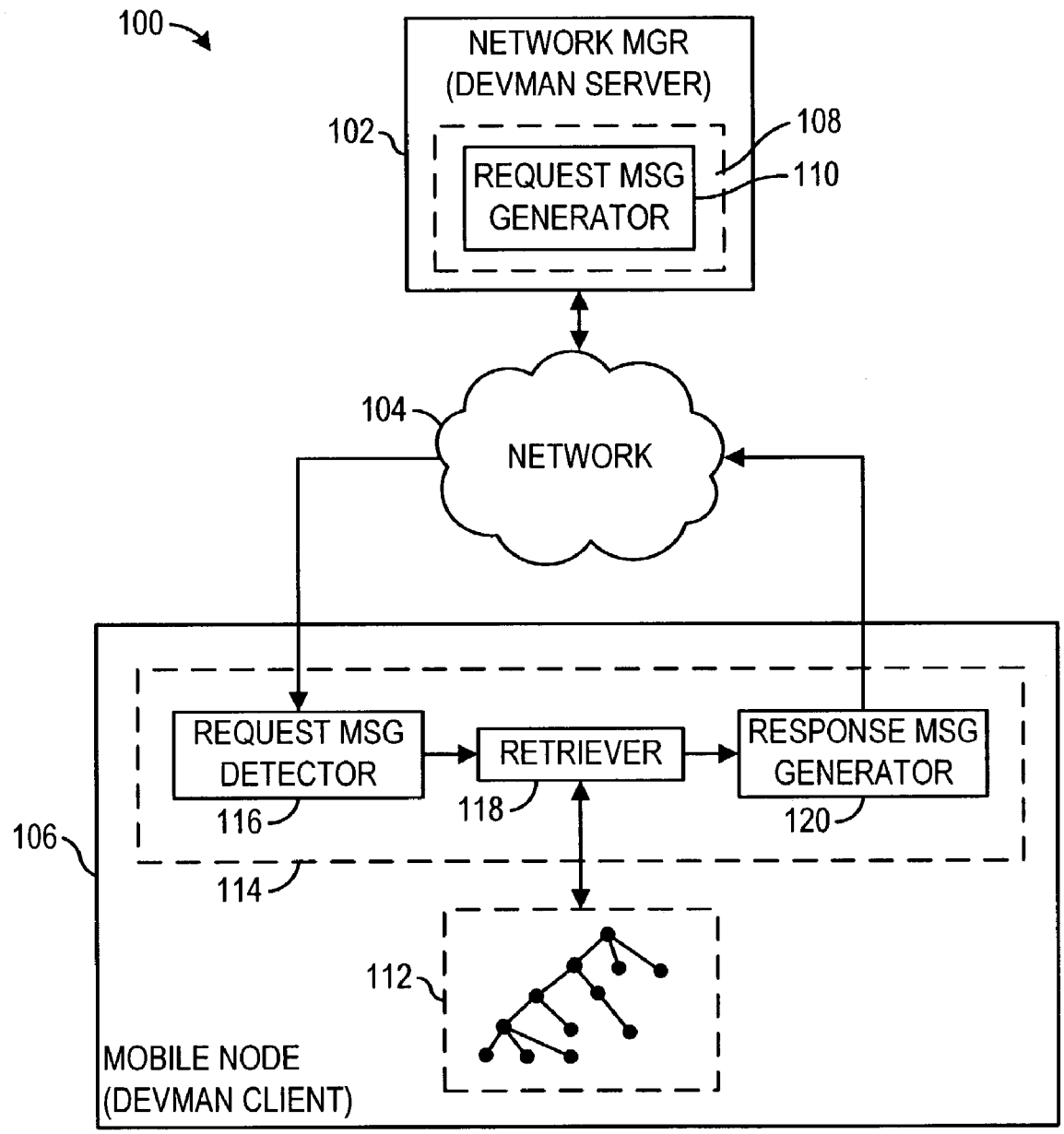
FIG. 1 shows a functional block diagram of a radio communication system embodying features of the present invention.

Referring to FIG. 1 of the drawings, the reference numeral 100 generally designates a radio communication system embodying features of the present invention. The system 100 includes a network manager 102 configured for managing radio communications via a network 104 with a mobile node 106. The radio communication system 100 preferably forms a multiple-access communication system permitting a large number of mobile nodes, such as the mobile node 106, to communicate therewith, such as a code-division, multiple-access (CDMA) cellular communication system that provides for packet-based communications. While the following description shall describe a preferable implementation of an embodiment of the present invention with respect to a cellular communication system, the communication system 100 is also representative of any of various other types of radio communication systems. Accordingly, while the following description shall describe a preferred embodiment of the present invention with respect to its implementation in a cellular communication system, the teachings of the present invention are analogously also implementable in other types of communication systems.

The network 104 may comprise a number of subnetworks (not shown), such as a radio access network (RAN) 14, a packet data network (e.g., an IP network), a virtual private network (VPN), and/or the like, which may be interconnected by way of gateways. Networks such as the network 104 are considered to be well-known in the art and, therefore, will not be discussed in further detail herein, except insofar as necessary to describe the invention.

In accordance with the present invention, the network manager 102 is configured as a device management (DevMan) server having an apparatus 108 which includes a request message generator 110. The request message generator 110 is effective for generating a Get message to request capability indicia of the mobile node 106 as defined by objects represented by a DevMan tree 112, stored in a conventional manner within the mobile node 116, and discussed in further detail below.

The mobile node 106 includes an apparatus 114 having a request message detector 116 configured for detecting Get messages generated by the request message generator 110 of the network manager 102 and transmitted via the network 104 to the mobile node 106. The request message detector 116 is connected to a retriever 118 for directing detected Get messages to the retriever 118. The retriever 118 is configured for retrieving an object map of the DevMan tree 112. The retriever 118 is connected, and is configured for sending a retrieved object map, to a response message generator 120. In accordance with the present invention, the response message generator 120 is configured for generating a response message comprising the object map, as described in further detail below.

Figure 2:
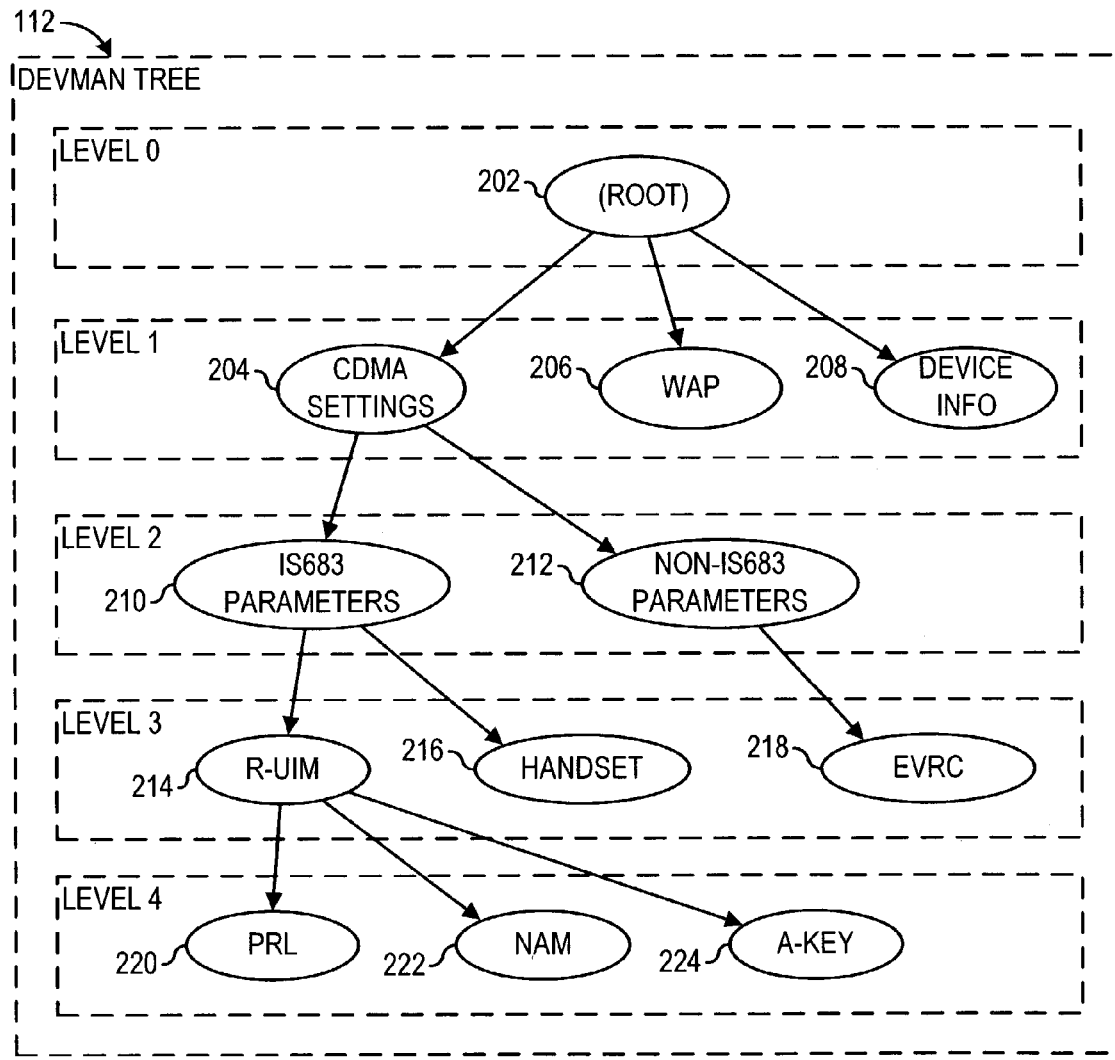
FIG. 2 exemplifies an object map of a device management tree of FIG. 1.

FIG. 2 exemplifies details of a DevMan tree 112. As shown therein, the DevMan tree 112 comprises groups of subtrees, each of which subtrees is formed of at least two nodes, such as defined by nodes 202, 204, 206, and 208. The DevMan tree, or any subtree thereof, is formed using one or more Device Description Framework (DDF) descriptions of objects. The DevMan tree 112 is sometimes also referred to as a logic tree or a root directory, and a subtree thereof is sometimes referred to as being a subroot of the root directory. Nodes, such as the nodes 202, 204, 210, 212, and 214 are referred to as "interior" nodes, having "child" nodes extending from them, but carrying no value (i.e., data). Nodes, such as the nodes 206, 208, 216, 218, 220, 222, and 224, are referred to as "leaf" nodes, or "leaf" objects, inasmuch as they carry values (i.e., data), but have no child nodes extending therefrom.

As further shown in FIG. 2, the nodes of the DevMan tree 116 constitute five levels, namely, levels 0 through 4. Level 0 comprises the root directory node 202, designated by a dot ".". Level 1 comprises a CDMA settings node 204, a WAP node 206, and a device info node 208, which extend from the root directory 202 of level 0. Since the nodes 206 and 208 have no further nodes extending from them, they constitute "leaf" nodes that carry values. Level 2 comprises an IS683 parameters node 210 and a non-IS683 parameters node 212, which extend from the CDMA setting node 204, of level 1. Level 3 comprises an R-UIM node 214 and a handset node 216 which extend from the IS683 parameters node 210, of level 2, and an EVRC node 218 which extends from the non-IS683 parameters node 210, of level 2. The handset node 216 and EVRC node 218 constitute leaf nodes. Level 4 comprises a PRL node 220, a NAM node 222, and an A-Key node 224, all of which extend from the R-UIM node 3 of level 3, and furthermore, constitute leaf nodes.

It is emphasized that the DevMan tree 116 shown in FIG. 2 is depicted by way of example only, and limitation, and that a DevMan tree may comprise any of a number of different nodes and/or objects arranged in of a number of different levels and/or structures from that shown in FIG. 2. DevMan trees are, however, considered to be well-known in the art and will, therefore, not be discussed in further detail herein, except insofar as necessary to describe the present invention.

The mobile node 106 is preferably configurable, or re-configurable, independent of the network manager 102. Configuration or re-configuration of the mobile node 106 affects the DevMan tree 116 thereof. That is to say, the arrangement of, and the description of objects contained in, the DevMan tree of the mobile node 106 are dynamically alterable, independent of the network manager 102 of the system 100, of which the mobile node 106 selectably forms a portion. To properly effectuate managerial control over the mobile node 106, the network manager 102 of the system 100, of which the mobile node 106 forms a portion, must be able to ascertain capability indicia associated with the DevMan tree 116 of the mobile node 102. Existing manners by which the network manager 102 obtains the indicia associated with the objects of a node, such as in a conventional wired network, create an excessive amount of signaling overhead when used in conjunction with a mobile node necessitating a connection by way of a radio link.

In one implementation, the desired DevMan tree information is obtained upon request of the network manager 102. In another implementation the information is provided upon initiation by the mobile node 106. The network manager 102 includes the apparatus 108 of an embodiment of the present invention. The apparatus 108 includes a request message generator 110 that operates to generate a Get message to request an object map of the DevMan tree 112 defined at the mobile node 106. The signaling overhead associated with the request message, and retrieval of indicia responsive thereto, is reduced relative to existing manners by which such indicia is obtainable by a network manager. The need otherwise to utilize a conventional Get-Bulk message or utilize a new-protocol message is obviated. Through generation of the Get message by the request message generator 110, the signaling overhead on the radio link is reduced relative to conventional generation of Get messages that necessitate a separate Get message for each object of the mobile node 106 or a Get-Bulk message to retrieve indicia associated with every object of the DevMan tree of the mobile node.

In accordance with the present invention, the request message generator 110 generates a Get, i.e. request, message, formatted to request the root directory, indicated by a dot".". Once generated and formatted, by a formatter, into the form indicated in the figure, the message is routed through the network 104 and sent by way of the radio link to the mobile node 106.

Once delivered to the mobile node 106, the apparatus 114 of the present invention is positioned to detect, by way of the request message detector 116, the Get message sent thereto. The retriever 118 of the apparatus 114 is operable responsive to detection by the detector 116 to retrieve an object may of the DevMan tree 112, which object map defines attributes associated with the objects of the DevMan tree 112.

The response message generator 120 is effective for generating a response containing the object map retrieved by the retriever 118. The response message generator 120 includes a formatter for formatting the response in a format, such as a SYNC format, and in which objects are identifiable, for example, in terms of their respective URL or URI values. It is noted that, as discussed further below, and in accordance with the present invention, the entire object map of the DevMan tree 112 is provided in a single response message, instead of multiple response messages as required by the prior art. The response message is returned by the mobile node 106 to the network manager 102. When received by the network manager 102, the network manager 102 is provided with the indicia to permit the network manager 102 better to effectuate control over the mobile node 106. Updated information associated with the DevMan tree 112 of the mobile node 106 is thereby provided to the network manager 102.

Figure 3:
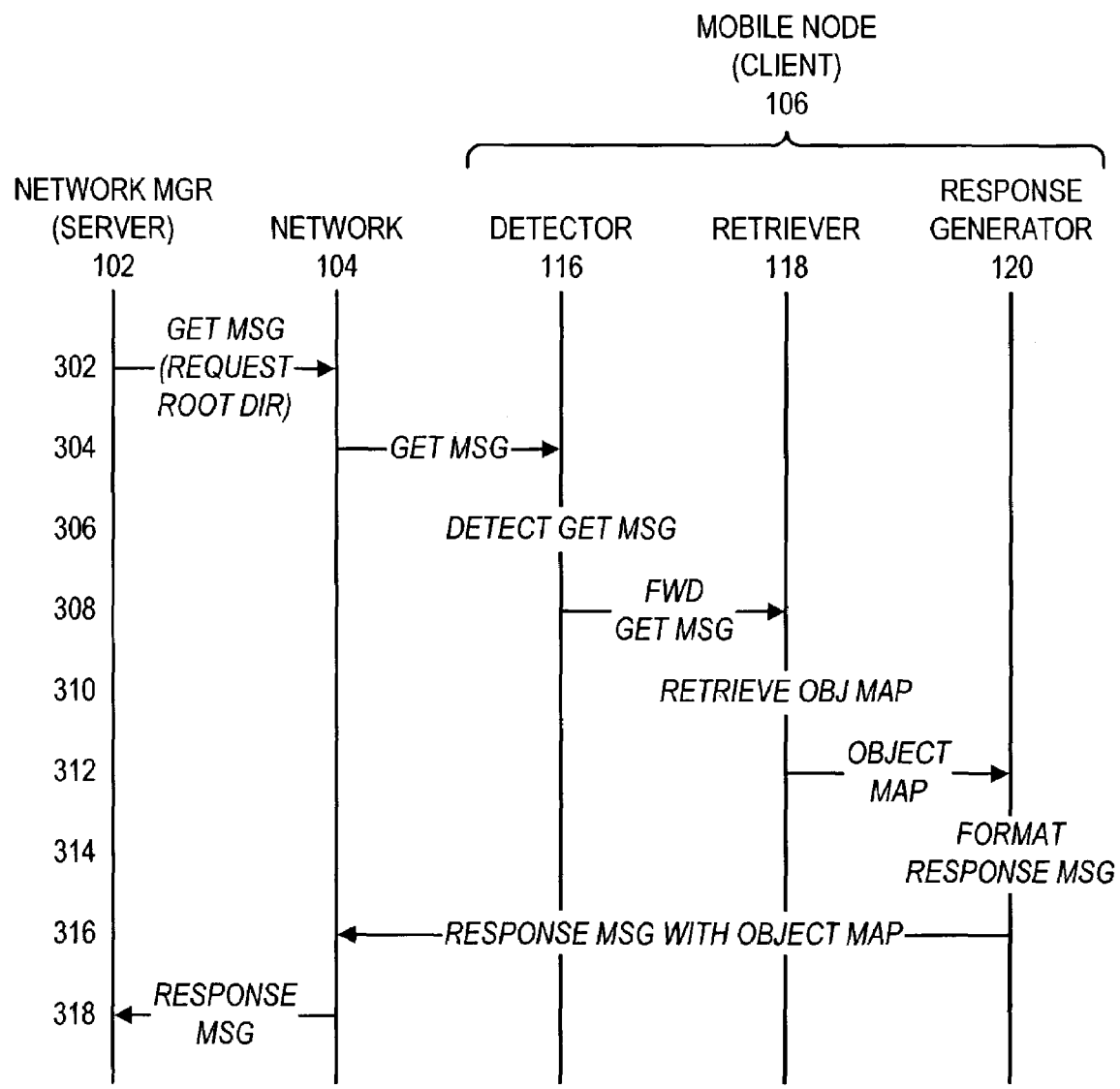
FIG. 3 shows a message sequence diagram which may be executed in accordance with the present invention.

FIG. 3 is an event sequence diagram which illustrates operation of the present invention at a high level. As shown therein, at event 302, the network manager 102, acting as a DevMan server, generates to the network 104 for delivery to the mobile node 106, a Get message requesting an root directory of the DevMan tree 112 of the mobile node 106. Such a Get message, designated by the reference numeral 400, is exemplified in FIG. 4, without constituting any limitation to the present invention. As shown, the Get message follows conventional Sync Markup Language (ML) protocol, although conventional Extensible Markup Language (XML) may also be used. It is noted that the Get command comprises lines 426-431 of FIG. 4, and the root directory, in particular, is specified at line 429. The protocol of the Get message is otherwise considered to be well-known to those skilled in the art and will, therefore, not be discussed in further detail herein.

At event 304, the network 104 delivers the Get message to the message detector 116 of the apparatus 114 of the mobile node 106, acting as a DevMan client. At event 306, the detector 116 detects the Get message and, at event 308, the detector 116 forwards the Get message to the retriever 118. At event 310, the retriever 118 retrieves the object map of the DevMan tree 116 and, at event 312, forwards the object map to the response generator 120. At event 314, the response generator 120 generates a response message formatted in accordance with the present invention to include the object map of the DevMan tree 112, as discussed in further detail below with respect to FIGS. 5-6. At event 316, the response generator 120 sends the formatted response message describing the object map of the DevMan tree 112 to the network 104 for delivery to the network manager 102. At event 318, the response message is forwarded to the network manager 102.

FIGS. 5 and 6 exemplify a portion of a response message 500 formatted in accordance with the present invention, but without limitation to the invention, for describing the entire object map of the DevMan tree 112 in a single response message. It is noted that a number of lines (e.g., lines 501-525) of the response message 500 are considered to constitute conventional protocol syntax and will, therefore, not be discussed in detail herein. Accordingly, line 526 depicts a first <Item> element for opening the root directory ("."), and line 527 indicates that the Item element of line 526 is a node (i.e., an interior node), rather than a leaf. Line 529 depicts a <Name> element which, according to the present invention, indicates that a second Item element (i.e., CDMA settings node 204) is to be recursively embedded within the first Item element. It is noted that this is a first level of recursion corresponding to Level 1 of the DevMan tree shown in FIG. 2. As will become apparent, each level of the DevMan tree 112, after Level 0, is recursively defined (analogous to being "pushed in a stack") using the <Name> element to introduce a new <Item> at a next level of recursion.

Accordingly, the Name element at line 533 recursively embeds within the CDMA Settings node, the IS683 Parameters node 210. The <Name> element at line 537 recursively embeds within the IS683 Parameters node 210, the R-UIM node 214. The <Name> element at line 541 recursively embeds within the R-UIM node 214, the PRL leaf 220, including, at line 549, data defined by the PRL leaf. At line 550, an </Item> element is encountered, wherein the R-UIM item is closed for PRL data, and at line 551, a second </Item> element is encountered, wherein the R-UIM item is closed for the PRL node.

At line 552, an <Item> is encountered, thus "returning" to the R-UIM item at node 214. The <Name> element at line 555 recursively embeds within the R-UIM node 214, the NAM leaf 222, including, at line 563, data defined by the NAM leaf. At line 564, an </Item> element is encountered, wherein the R-IUM item is closed for NAM data, and at line 565, a second </Item> element is encountered, wherein the R-UIM item is closed for the NAM node.

It may be appreciated that, while not described in further detail herein, the remainder of the object map of the DevMan tree 112 may be defined using recursion as described herein, to effectively push items (or nodes) into a stack.

Thus, by using the present invention, an entire object map of a DevMan tree may be readily defined within a single response message, such as the response message 500, thereby utilizing bandwidth more efficiently than is possible with conventional technology in which, at a minimum, a response message is needed for each node of a DevMan tree.

It is understood that the present invention may take many forms and embodiments. Accordingly, several variations may be made in the foregoing without departing from the spirit or the scope of the invention. For example, servers (not shown) other than the network server, may send a Get message to the mobile node 106 for the object map 112, or servers may forward the object map of the DevMan tree 112 of the mobile node to other servers as a mobile node moves from one server to another server, thereby further conserving bandwidth. If functionality is added to the mobile node 106 which would effect a change in the DevMan tree, then the mobile node itself may initiate its own Get message to send an updated object map to the network manager. At other times, a DevMan server may get misaligned with the DevMan client, and a copy of the object map to re-align itself with the DevMan client. A network server may be configured so that, after sending a Get message, it may accept a response according either to the present invention, or to the prior art, so that the present invention may readily implemented and be "backward-compatible" with existing mobile nodes. Terminology used herein may vary, too; for example, a new <Item> may be introduced by <NewElement> or <NextElement> rather than <Name>.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. In a radio communication system defining a communication network having a mobile node forming a portion thereof, the communication network managed by a network manager, an improvement of apparatus for the mobile node for facilitating retrieval of capability indicia of the mobile node, the capability indicia representative of a dynamically alterable mobile node capability defined by objects maintained thereat, said objects being related to one another in a device management ("DevMan") tree according to an object map of the DevMan tree, said apparatus comprising:
- a detector configured to receive a request message from said network manager for a root directory of said DevMan tree maintained at said mobile node;
- a retriever operatively connected to said detector, said retriever being responsive to detection of said request message by said detector for retrieving said object map of said DevMan tree maintained at said mobile node; and
- a response generator operatively connected to said retriever for generating to said network manager in a single response message a description of said object map of said DevMan tree.

2. The apparatus of claim 1 wherein said object map defines at least a first level of at least one first object in said DevMan tree and at least a second level of at least one second object in said DevMan tree, and wherein
said at least a second level of said at least one second object is embedded in at least a first level of recursion within said at least a first level of said at least one first object.

3. The apparatus of claim 1 wherein said object map defines at least a first level of at least one first object in said DevMan tree and at least a second level of at least one second object in said DevMan tree, and wherein
said at least a second level of said at least one second object is embedded in at least a first level of recursion within said at least a first level of said at least one first object; and wherein said description of said retrieved object map of said entire DevMan tree comprises:
an element designated to indicate within said at least a first level of said at least one first object that said at least said first level of recursion is embedded within said at least a first level of said at least one first object.

4. The apparatus of claim 1 wherein said object map defines at least a first level of at least one first object in said DevMan tree and at least a second level of at least one second object in said DevMan tree, and wherein said description of said at least a second level of said at least one second object is embedded in at least a first level of recursion within said at least a first level of said at least one first object, thereby defining a chain of recursion from said at least a first level of said at least one first object to at least said second level of said at least one second object; and wherein said description of said retrieved object map of said entire DevMan tree comprises:
an element designated to indicate within said at least a first level of said at least one first object that said at least a first level of recursion is embedded within said at least a first level of said at least one first object; and
a data format identifier designated to identify said at least one first object as at least one first node in said chain of recursion, and to identify said at least one second object as at least one second node in said chain of recursion.

5. The apparatus of claim 1 wherein said object map defines at least a first level of at least one first object in said DevMan tree and at least a second level of at least one second object in said DevMan tree, and wherein
said at least a second level of said at least one second object is embedded in at least a first level of recursion within said at least a first level of said at least one first object, thereby defining a chain of recursion from said at least a first level of said at least one first object to at least said second level of said at least one second object, said second level of said at least one second object being a last level in said chain of recursion; and wherein said description of said retrieved object map of said entire DevMan tree comprises:
an element designated to indicate within said at least a first level of said at least one first object that said at least said first level of recursion is embedded within said at least a first level of said at least one first object;
a first data format identifier designated to identify said at least one first object as at least one first node in said chain of recursion; and
a second data format identifier designated to identify said at least one second object as a leaf node in said chain of recursion.

6. The apparatus of claim 1 wherein said communication system utilizes Sync ML (Sync Mark-up Language) protocol and wherein said request comprises a first Sync ML-formatted message, and said response comprises a second Sync ML-formatted message.

7. The apparatus of claim 1 wherein said communication system utilizes Extensible Markup Language (XML) protocol and wherein said request comprises a first XML-formatted request message, and said response comprises a second XML-formatted response message.

8. The apparatus of claim 1 wherein said request message from said network manager comprises a Get command for the root directory of said DevMan tree.

9. In a radio communication system defining a communication network having a mobile node forming a portion thereof, the communication network managed by a network manager, an improvement of apparatus for facilitating retrieval by the network manager of capability indicia of the mobile node, said capability indicia representative of a dynamically alterable mobile node capability related to objects maintained thereat, said objects being related to one another in a device management ("DevMan") tree according to an object map of the DevMan tree, said apparatus comprising:
a network-positioned request generator operated by said network manager, said network-positioned request generator for generating a request message for communication to the mobile node, the request message requesting a root directory of said DevMan tree maintained at said mobile node.

10. The apparatus of claim 9 wherein said object map defines at least a first level of at least one first object in said DevMan tree and at least a second level of at least one second object in said DevMan tree, and wherein said at least a second level of said at least one second object is embedded in at least a first level of recursion within said at least a first level of said at least one first object.

11. The apparatus of claim 9 wherein said object map defines at least a first level of at least one first object in said DevMan tree and at least a second level of at least one second object in said DevMan tree, and wherein said at least a second level of said at least one second object is embedded in at least a first level of recursion within said at least a first level of said at least one first object; and wherein said description of said retrieved object map of said entire DevMan tree comprises:
an element designated to indicate within said at least a first level of said at least one first object that said at least said first level of recursion is embedded within said at least a first level of said at least one first object.

12. The apparatus of claim 9 wherein said object map defines at least a first level of at least one first object in said DevMan tree and at least a second level of at least one second object in said DevMan tree, and wherein said at least a second level of said at least one second object is embedded in at least a first level of recursion within said at least a first level of said at least one first object, thereby defining a chain of recursion from said at least a first level of said at least one first object to at least said second level of said at least one second object; and wherein said description of said retrieved object map of said entire DevMan tree comprises:
- an element designated to indicate within said at least a first level of said at least one first object that said at least a first level of recursion is embedded within said at least a first level of said at least one first object; and
- a data format identifier designated to identify said at least one first object as at least one first node in said chain of recursion, and to identify said at least one second object as at least one second node in said chain of recursion.

13. The apparatus of claim 9 wherein said object map defines at least a first level of at least one first object in said DevMan tree and at least a second level of at least one second object in said DevMan tree, and wherein said at least a second level of said at least one second object is embedded in at least a first level of recursion within said at least a first level of said at least one first object, thereby defining a chain of recursion from said at least a first level of said at least one first object to at least said second level of said at least one second object, said second level of said at least one second object being a last level in said chain of recursion; and wherein said description of said retrieved object map of said entire DevMan tree comprises:
- an element designated to indicate within said at least a first level of said at least one first object that said at least said first level of recursion is embedded within said at least a first level of said at least one first object;
- a first data format identifier designated to identify said at least one first object as at least one first node in said chain of recursion; and
- a second data format identifier designated to identify said at least one second object as a leaf node in said chain of recursion.

14. The apparatus of claim 9 wherein said communication system utilizes Sync ML (Sync Mark-up Language) protocol and wherein said request comprises a first Sync ML-formatted message, and said response comprises a second Sync ML-formatted message.

15. The apparatus of claim 9 wherein said communication system utilizes Extensible Markup Language (XML) protocol and wherein said request comprises a first XML-formatted request message, and said response comprises a second XML-formatted response message.

16. The apparatus of claim 9 wherein said request message from said network manager comprises a Get command for the root directory of said DevMan tree.

17. In a method for communicating in a radio communication system defining a communication network having a mobile node forming a portion thereof, the communication network managed by a network manager, an improvement of a method for facilitating retrieval of capability indicia of the mobile node, the capability indicia representative of a dynamically alterable mobile node capability defined by objects maintained thereat, said objects being related to one another in a device management ("DevMan") tree according to an object map of the DevMan tree, said method comprising steps of:
- receiving a request message from a network manager for the root directory of said DevMan tree maintained at said mobile node;
- retrieving, in response to receipt of said request message, said object map of said DevMan tree maintained at said mobile node; and
- generating to said network manager in a single response message a description of said retrieved object map of said DevMan tree.

18. The method of claim 17 wherein said object map defines at least a first level of at least one first object in said DevMan tree and at least a second level of at least one second object in said DevMan tree, and wherein said step of generating further comprises:
- embedding said at least a second level of said at least one second object in at least a first level of recursion within said at least a first level of said at least one first object.

19. The method of claim 17 wherein said object map defines at least a first level of at least one first object in said DevMan tree and at least a second level of at least one second object in said DevMan tree, and wherein said step of generating further comprises:
- embedding said at least a second level of said at least one second object in at least a first level of recursion within said at least a first level of said at least one first object; and
- designating an element to indicate within said at least a first level of said at least one first object that said at least said first level of recursion is embedded within said at least a first level of said at least one first object.

20. The method of claim 17 wherein said object map defines at least a first level of at least one first object in said DevMan tree and at least a second level of at least one second object in said DevMan tree, and wherein said step of generating further comprises:
- embedding said at least a second level of said at least one second object in at least a first level of recursion within said at least a first level of said at least one first object, thereby defining a chain of recursion from said at least a first level of said at least one first object to at least said second level of said at least one second object;
- designating an element to indicate within said at least a first level of said at least one first object that said at least a first level of recursion is embedded within said at least a first level of said at least one first object; and
- designating a data format identifier to identify said at least one first object as at least one first node in said chain of recursion, and to identify said at least one second object as at least one second node in said chain of recursion.

21. The method of claim 17 wherein said object map defines at least a first level of at least one first object in said DevMan tree and at least a second level of at least one second object in said DevMan tree, and wherein said step of generating further comprises:
- embedding said at least a second level of said at least one second object in at least a first level of recursion within said at least a first level of said at least one first object, thereby defining a chain of recursion from said at least a first level of said at least one first object to at least said second level of said at least one second object, said second level of said at least one second object being a last level in said chain of recursion;
- designating an element to indicate within said at least a first level of said at least one first object that said at least said first level of recursion is embedded within said at least a first level of said at least one first object;
- designating a first data format identifier to identify said at least one first object as at least one first node in said chain of recursion; and
- designating a second data format identifier to identify said at least one second object as a leaf node in said chain of recursion.

22. The method of claim 17 wherein said request message from said network manager comprises a Get command for the root directory of said DevMan tree.

* * * * *